United States Patent
Goradesky

(10) Patent No.: US 7,940,925 B2
(45) Date of Patent: *May 10, 2011

(54) CLIP MOUNT FOR CELLULAR PHONE ATTACHMENT

(75) Inventor: Harold S. Goradesky, Fort Lauderdale, FL (US)

(73) Assignee: A.G. Findings & Mfg. Co., Inc., Sunrise, FL (US)

( * ) Notice: Subject to any disclaimer, the term of this patent is extended or adjusted under 35 U.S.C. 154(b) by 629 days.

This patent is subject to a terminal disclaimer.

(21) Appl. No.: 12/051,235

(22) Filed: Mar. 19, 2008

(65) Prior Publication Data

US 2008/0173683 A1    Jul. 24, 2008

Related U.S. Application Data

(63) Continuation of application No. 10/791,128, filed on Mar. 2, 2004, now Pat. No. 7,369,656.

(60) Provisional application No. 60/534,206, filed on Jan. 5, 2004.

(51) Int. Cl.
*H04M 1/00* (2006.01)

(52) U.S. Cl. ........................................ 379/446; 379/454

(58) Field of Classification Search .................. 379/446, 379/450, 454, 455; 224/197, 242, 271; 24/3.11, 24/3.13; 455/575.1
See application file for complete search history.

(56) References Cited

U.S. PATENT DOCUMENTS

| 6,098,858 A | 8/2000 | Laugesen | 224/197 |
| 6,283,348 B1 | 9/2001 | Wang | 224/271 |

*Primary Examiner* — Tuan D Nguyen

(74) *Attorney, Agent, or Firm* — Robert C. Kain, Jr.

(57) ABSTRACT

The clip-mount operates with a button mount and includes a body defining a locking cavity for the button and a resilient locking tongue therein. The tongue biases the button into a locking position. The tongue includes at least one cam surface. A movable cam actuator on the body includes another cam surface which coacts with the first cam permitting the tongue to flex from a locking to an unlocking position. An enhancement includes one cam and cam follower, to flex the tongue from the locking to the unlocking position, and a second cam and cam follower to flex the tongue to a button locking position. The method includes biasing the button to a locking position, providing a sloped cam surface on the resilient locking tongue and moving a second cam surface over the tongue cam surface thereby flexing the tongue from a locked to a button release position.

18 Claims, 4 Drawing Sheets

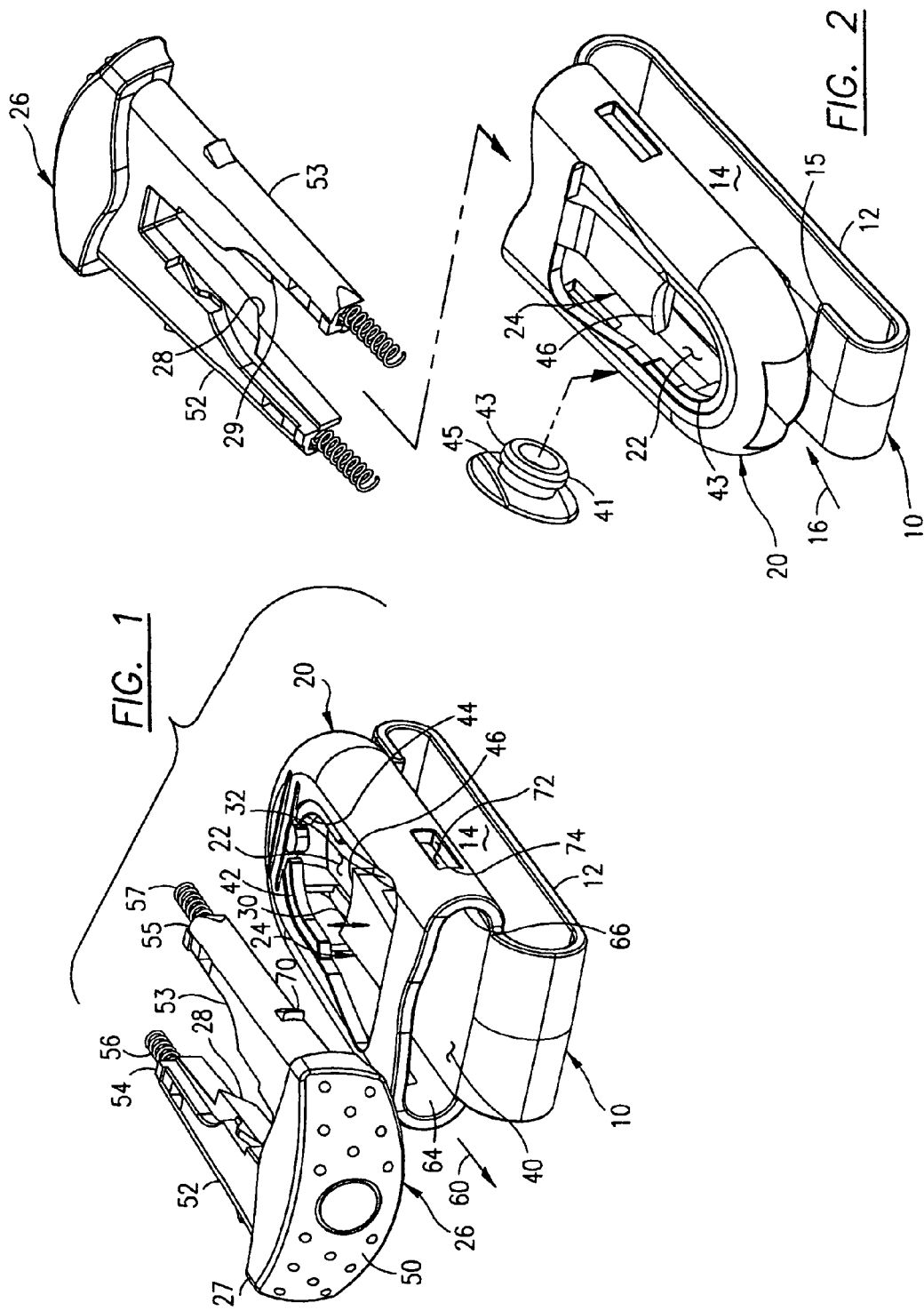

CLIP MOUNT FOR CELLULAR PHONE ATTACHMENT

This is a continuation patent application based upon application Ser. No. 10/791,128 filed Mar. 2, 2004, now U.S. Pat. No. 7,369,656 which was a regular patent application based upon and claiming the benefit of provisional patent application Ser. No. 60/534,206, filed Jan. 5, 2004.

The present invention relates to a clip mount for a cellular telephone attachment system with a button mount and a method therefor.

BACKGROUND OF THE INVENTION

Many cell phone users utilize a clip mount which may be attached to his or her belt, purse or other strap. These clip mount systems coact with a clip-on structure which is removably attached to the generally rectangular body of the cellular telephone. The sub-system attachment to the cellular telephone includes a button which protrudes from the backside of the sub-system.

The present invention is a clip mount for this type of button mount.

OBJECTS OF THE INVENTION

It is an object of the present invention to provide a clip mount for a cellular telephone attachment system with a button mount.

It is another object of the present invention to provide a two piece clip mount with a movable actuator that flexes a resilient locking tongue thereby releasing the button from the locking cavity in the clip mount body.

It is a further object of the present invention to utilize first and second cam surfaces which coact together to flex the resilient locking tongue from a locking position to a button release or unlock position.

It is another object of the present invention to provide a movable actuator which, in a rest position, biases the resilient locking tongue into a locking position and, in a release position, biases the locking tongue into an unlock position.

SUMMARY OF THE INVENTION

The clip mount operates with a cellular button mount. The clip mount includes a body defining a complementary locking cavity for the button and a resilient locking tongue disposed in the locking cavity. The tongue is adapted to bias the button into a locking position in the locking cavity. The tongue includes at least one cam surface. A movable cam actuator, movably mounted on the body, includes another cam surface which coacts with the first cam surface permitting the resilient locking tongue to flex from a locking position to an unlocking position. An enhancement includes one cam and cam follower to flex the tongue from the locking the unlocking position and a second cam and cam follower to flex the tongue to the locking position. The method of mounting includes biasing the button to a locking position in the locking cavity, providing a sloped cam surface on the resilient locking tongue and moving a second cam surface over the locking tongue cam surface thereby flexing the tongue from a locked to a button release position. Another embodiment of the invention includes a tongue with two cam surfaces, one facing outboard and a second facing inboard. The cam actuator has two actuator surfaces, one coacting with the tongue's outboard surface and the other coacting with the tongue's inboard facing surface. When the actuator is at rest (biased upward), the tongue is biased outward (laterally outward from the locking cavity) by one cam surface (to achieve a locking cam action) and when the actuator is depressed downward, the tongue moves laterally inward due to the other cam surface (to achieve an unlocking cam action). Alternatively, the locking cam system (with the actuator at rest in an upward position) can be used separate from the unlocking cam system.

BRIEF DESCRIPTION OF THE DRAWINGS

Further objects and advantages of the present invention can be found in the detailed description of the preferred embodiments when taken in conjunction with the accompanying drawings in which:

FIG. 1 diagrammatically illustrates one embodiment of the clip mount showing the actuator member removed from the clip body;

FIG. 2 diagrammatically illustrates another embodiment of the present invention and particularly shows the button mount (the cellular telephone and attachment sub-structure is not shown affixed to the button mount), actuator and clip body;

DETAILED DESCRIPTION OF THE PREFERRED EMBODIMENTS

Figure 5:
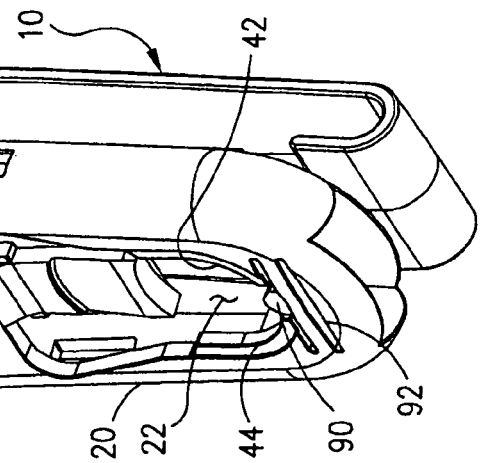
FIG. 5 diagrammatically illustrates the first embodiment of the invention with a resilient nub to angularly position the phone with respect to the clip mount.

The present invention relates to a clip mount for a cellular telephone attachment system having a button mount and a method of mounting.

FIG. 1 shows clip mount 10 including a belt loop 12 having a belt loop cavity 14 therein. Similar numerals designate similar items throughout all the figures. Belt loop 12, as shown in FIG. 2, has a free end 15 that permits the user to slip a strap or a belt as shown by arrow 16 into belt or strap cavity 14.

Figure 3:
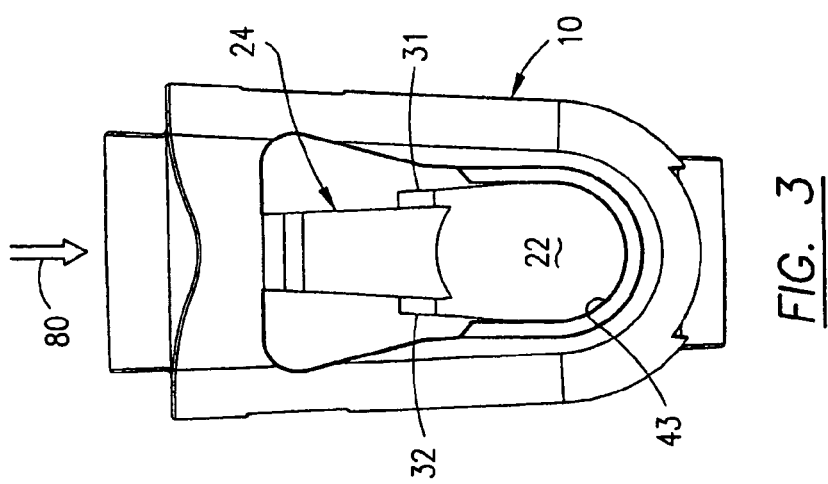
FIG. 3 is a front elevational view of the clip mount primarily illustrating the resilient locking tongue and the first cam surfaces.

Although the figures show a specific manufactured embodiment for the clip mount, other structures may utilize the key portions of the present invention clip mount 10 includes three (3) basic elements which are clip body 20, defining a locking cavity 22, a resilient tongue 24, an actuator 26, and some cam surfaces. Actuator cam surfaces are located on actuator 26 and one of those cam surfaces is numerically identified as cam surface 28. Resilient tongue 24 moves or flexes as shown by double headed arrow 30 based upon the position of actuator cam surface 28 and another cam surface complementary thereto. In FIG. 1, a corresponding tongue cam surface 32 is illustrated. FIG. 3 shows resilient locking tongue cam surfaces 31 and 32 and actuator cam surface 28 (FIG. 1) rides along and atop resilient locking tongue cam surface 31. When the actuator cam surfaces 28, 29 (FIG. 2) ride atop the locking tongue cam surfaces 32, 31 (FIG. 3), resilient tongue 24 flexes from a locking position to a button release or unlocking position (laterally inboard flexation) thereby freeing the button from the clip mount 10.

It should be noted that other mechanical structures could accomplish the same features described herein and FIGS. 1-6 show one working embodiment. For example, although actuator 26 is shown as substantially U-shaped with two legs and two cam surfaces, a single movable member with a user actuatable surface and a single cam could operate to move resilient locking tongue 24 from a button locking position to an unlocking position.

Clip body 20 includes a channel cavity 40 into which is movably disposed actuator member 26. A resilient locking tongue 24 is mounted within cavity 40. Locking tongue 24 is adopted to flex or move as shown by double headed arrow 30 in FIG. 21. When a button, such as button 41 in FIG. 2, is placed within locking cavity 22, the button coacts with semi-circular rim member which, in FIG. 1, consists of rim member 42 and rim member 44. Essentially, button 41 includes a peripheral plate 43 and a stem 45. Peripheral plate 43 locks beneath rim elements 43, 44 and resilient tongue 24 includes a terminal edge 46 that coacts with either stem 45 or peripheral plate 43 to securely lock button 41 in locking cavity 22. In general to release button 41 from locking cavity 22, resilient tongue 30 must be flexed generally inboard into channel cavity 40 such that the tongue no longer coacts with stem 45 or plate 43 thereby permitting the removal of button 41 and any attached cell phones or cell phone structure.

Actuator member 26 includes user actuation surface 50. Actuator member 26 is generally U-shaped consisting of a base 27 and legs 52, 53. The terminal ends 54, 55 of legs 52, 53 define stops. A resilient member, such as springs 56, 57 coact with stop 54, 55 to bias actuation member 26 in a direction shown by arrow 60, that is, in a direction such that resilient locking tongue 24 is in a locking position with respect to button 41. The user depresses surface 50, the actuator moves downward (FIG. 3), the cam surfaces engage and push the tongue laterally inward. Upon removal of the depressing force on surface 50, springs or resilient elements 56, 57 force the actuator back to the original position.

FIG. 2 shows that actuator 26 is positioned in channel cavity 40 and button 41 fits in locking cavity 22.

In FIG. 1, legs 52, 54 are movably mounted in leg channels 64, 66. Further, once actuator member 26 is disposed in channel cavity 40, actuator member 26 cannot be removed because stop 70 locks within and also moves within side cutout 72. Removal of actuator 26 is prohibited because stop 70 cannot pass edge 74 defining one end of side cutout 72.

FIG. 2 diagrammatically illustrates clip mount 10 in a slightly different embodiment. Rather have two rim segments 42, 44 as shown in FIG. 1, a substantially semi-circular rim 43 defines one side of locking cavity 22. Edge 46 of resilient locking tongue 24 captures the opposite end of button 41. Button 41 is shown as being insertable into locking cavity 22 and actuator 26 is shown as being insertable into channel cavity 40 (not identified in FIG. 2).

FIG. 3 diagrammatically illustrates clip mount 10 and shows cam surfaces 31, 32 on resilient locking tongue 24. Semi circular rim 43 is also shown in FIG. 3. Arrow 80 shows the direction in which actuator 26 is inserted. Actuator 26 moves up and down in the channel cavity 40 after insertion. It should be noted that actuator 26 is utilized in conjunction with the split rim embodiment shown in FIG. 1 and in the single, substantially semi-circular rim embodiment shown in FIG. 2.

Figure 4:
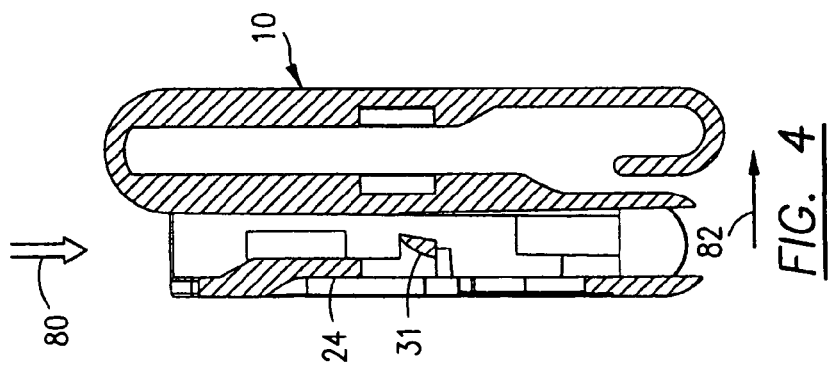
FIG. 4 diagrammatically illustrates a cross-sectional view primarily showing the slope of the first cam surface on the locking tongue.

FIG. 4 diagrammatically shows a substantially cross-sectional view of clip 10. Particularly, resilient tongue cam surface 31 is shown as either an inclined slope or a gentle curved slope. Since actuator member 26 is inserted in the direction shown by arrow 80, and since cam surfaces 28, 29 (FIG. 2) operate on cam surfaces 32, 31, the depression of actuator 26 causes tongue cam surfaces 32, 31 to move laterally inboard in the direction of arrow 82 in FIG. 4 thereby causing inboard flexation of resilient locking tongue 24. This inboard movement of tongue 24 causes terminal locking surface 46 (FIG. 2) of tongue 24 to disengage button 41 thereby releasing button 41 and any associated structure attached to button 41 from clip mount 10.

FIG. 5 diagrammatically illustrates clip mount 10 in the embodiment shown in FIG. 1. Particularly, rim segments 42, 44 are separated by a resiliently mounted knob 90. Particularly, knob 90 is mounted on a bar 92 spanning left and right sides of clip body 20. Bar 90 flexes and is resilient.

Figure 6:
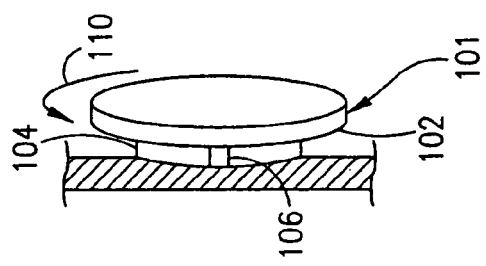
FIG. 6 diagrammatically illustrates the button mount used with the embodiment of the invention shown in FIG. 5.

FIG. 6 diagrammatically shows button 101 having a top plate 102 and a stem 104. Stem 104 includes a plurality of notches or cutouts, one of which is cutout 106. Button 101 fits within locking cavity 22. When the cell phone structure attached to button 101 is rotated as shown by arrow 110 in FIG. 6, knob 90 may snap into or lock into notch 106 of button 101. In this manner, the cell phone or clip on element for the cell phone can be rotated clockwise or counterclockwise about face 130 of clip body 20. Button 41 shown in FIG. 2 does not have notches and rim 43 in FIG. 3 is not split and does not have a resilient knob. However, button 101 may work in conjunction with unitary rim 43. Similarly, button 41 may work in conjunction with split rim 42, 44 provided that knob 90 does not impede the button locking ability of button 41. In this manner, the buttons are inter-changeable but additional functionality is noted with button 101 and resilient knob 90 in FIG. 5.

FIGS. 1-5 diagrammatically illustrate a clip mount wherein, upon depression of actuator member 26, cam actuator surfaces 28, 29 coact with cam follower surfaces 32, 31 (FIG. 3) such that tongue 24 flexes or moves laterally inboard (direction 82, FIG. 4) thereby releasing the button from locking cavity 22.

Figure 7:
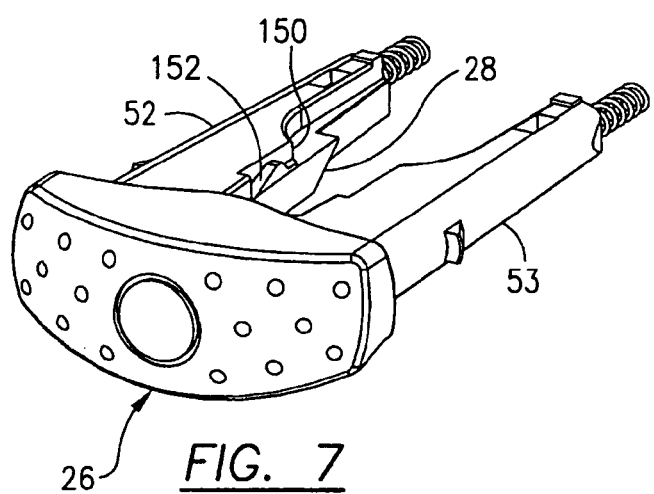
FIG. 7 shows the actuator member with a lower cam actuator surface (for the button release) and shows an upper cam actuator surface that, when the actuator is upwardly biased (a rest position), the upper cam actuator surface acts on an upper tab laterally extending from the tongue (FIG. 8) to bias the tongue laterally outward.
Figure 8:
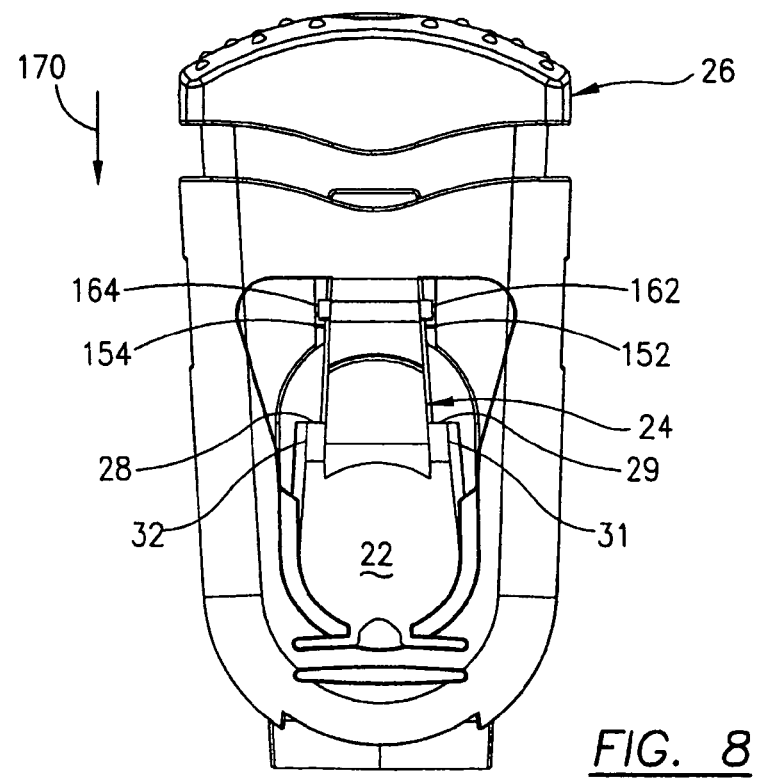
FIG. 8 shows the actuator in the clip-mount body and the laterally extending tabs affected by the upper cam actuator surfaces. When the actuator is depressed down, the lower surface moves the tongue inwards thereby releasing the button from the lip lock—when the actuator is biased upward (see spring in FIG. 2), the actuator biases the tongue laterally outward thereby creating additional locking force or bias on the button 43 (FIG. 2).

In FIGS. 7 and 8, actuator 26 includes locking cam surfaces and unlocking cam surfaces. Unlocking cams are represented by cam actuator surfaces, one of which is surface 28, which is sometimes identified herein as the first cam actuator surface. Locking cams are provided on actuator 26 as cam actuator surfaces 152, 154 in FIGS. 7 and 8. Actuator surfaces 152, 154 coact with second cam follower surfaces 162, 164 which are, in the illustrated embodiment, found on laterally extending tabs protruding from tongue 24. An alternative embodiments, the cam follower surfaces 162, 164 may be formed on the tongue body 24 itself rather than on extending tabs.

FIG. 8 shows actuator 56 in a rest or a button locking position. Further, FIG. 8 shows actuator 26 in a upright or raised position. In this locking or raised position, second cam actuator surfaces 152, 154 bias locking tongue 24 upward (laterally outward from the cavity) thereby providing additional locking force for the button mount adapted to be disposed in locking cavity 24. When actuator 26 is moved downward as shown by arrow 170 in FIG. 8, the locking cam systems 162-152, 164-154 release and the unlocking cams 29, 31 and 28, 32 operate to laterally depress tongue 24 (in a direction 82 shown in FIG. 4) thereby releasing the button mount from locking cavity 22.

FIG. 8 shows the upper and lower cams, the lower cams 29-31, 28-32 are explained in connection with FIG. 2 and the upper cams 162-152, 164-154 cooperate to move the tongue outward when the actuator member is at rest the common biased position.

Figure 9:
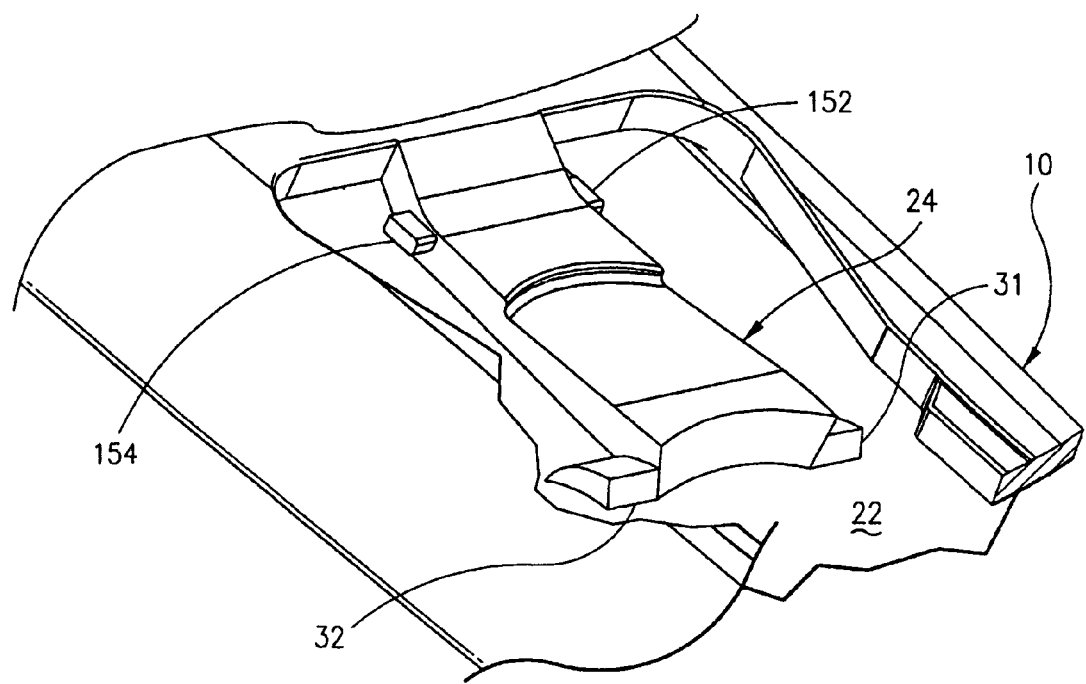
FIG. 9 diagrammatically illustrates a detail, cut-away view of the tongue with the lock cam surfaces and unlock cam surfaces.

FIG. 9 shows a detail, cut-away view of the tongue 24, extending into locking cavity 22. The tongue 24 has, extending transversely from its longitudinal axis, a pair of locking cam follower surfaces 154, 152 and a pair of unlocking cam follower surfaces 32, 31. These follower surfaces track the cam surfaces on the movable actuator. When the actuator (not shown in FIG. 9) is at rest in its biased upward position, the locking cams 154, 152 bias tongue 24 laterally outward from locking cavity 22 thereby additionally locking the button (not shown) in the locking cavity 22. When the actuator is depressed downward, the locking cams release and the unlocking cam system is activated (see cam followers 32, 31) thereby moving tongue 24 laterally inward towards cavity 22. This releases the button from the locking cavity.

It should be noted that the locking cam-cam follower system may be employed separate from the unlocking cam-cam follower system. It should also be noted that the cam and cam followers may be deployed at different locations and on different components than shown in the preferred embodiment.

The claims appended hereto are meant to cover modifications and changes within the scope and spirit of the present invention.

What is claimed is:

1. A clip mount for a cellular phone attachment system with a button mount, said clip mount comprising:
    a body defining a complementary locking cavity for said button;
    a resilient locking tongue disposed in said complementary locking cavity adapted to bias said button into a locking position in said locking cavity, said resilient locking tongue having at least two cam surfaces, a first cam surface for inboard movement and a second cam surface for outboard movement; and
    a movable cam actuator movably mounted on said body and having at least two cam actuator surfaces, a first and a second cam actuator surface, coacting with said at least two cam surfaces wherein, in a first position of said first cam and first cam actuator surfaces, said resilient locking tongue is adapted to bias said button outboard into said locking position in said locking cavity and, in a second position, said second cam actuator surface acting on said second cam surface flexes said resilient locking tongue inboard and out of said locking position thereby adapted to release said button.

2. A clip mount as claimed in claim 1 wherein said movable cam actuator is biased towards said first position;
    said body is generally rectangular and said cam actuator is elongated and moves longitudinally in said rectangular body.
    body defines a channel therein for said cam actuator, said cam actuator moving within said channel;
    said cam actuator includes a first, exposed terminal end defining a user actuation surface thereat and a second end disposed within said channel of said body; and
    a resilient member, disposed between said cam actuator and said body, biasing said cam actuator towards said first position.

3. A clip mount as claimed in claim 2 wherein said cam actuator is U-shaped having a base and two legs extending from the base, said user actuation surface being defined on said base of said U-shaped cam actuator and at least one of legs defining said cam actuation surface.

4. A clip mount as claimed in claim 3 wherein said respective cam surfaces and said cam actuator surfaces have complementary sloped surfaces.

5. A clip mount as claimed in claim 4 wherein channel is channel cavity and said body defines leg channels complementary to said legs of said cam actuator in said channel cavity, said legs of said cam actuator move within said complementary leg channels.

6. A clip mount as claimed in claim 5 wherein said resilient member is a spring.

7. A clip mount as claimed in claim 6 said spring is a pair of springs, wherein each actuator leg has a stop and a respective spring of said pair of springs acts on a corresponding stop and a respective opposing body site in said clip body thereby biasing said cam actuator towards said first position.

8. A clip mount as claimed in claim 7 wherein said locking cavity is defined by at least a semi-circular rim, said rim adapted to catch said button therein, said resilient locking tongue disposed opposite said semi-circular rim and adapted to bias said button towards said rim into said locking position.

9. A clip mount as claimed in claim 8 wherein said button defines a plurality of notches, said semi-circular rim including a resiliently mounted nub adapted to coact with one of said plurality of notches on said button stem.

10. A clip mount as claimed in claim 9 wherein said button has a stem and a peripheral plate atop said stem, said stem defines said plurality of notches.

11. A clip mount as claimed in claim 10 wherein said resilient member is a spring.

12. A clip mount as claimed in claim 1 wherein said resilient member is a spring.

13. A clip mount for a cellular phone attachment system with a button mount, said clip mount comprising:
    a body defining a complementary locking cavity for said button;
    a resilient locking tongue disposed in said complementary locking cavity adapted to bias said button into a locking position in said locking cavity, said resilient locking tongue having a locking cam surface and an unlocking cam surface; and
    a movable cam actuator movably mounted on said body and having a complimentary locking cam actuator surface respectively coacting with said locking cam surface and having a complimentary unlocking cam actuator surface respectively coacting with said unlocking cam surface wherein, in a predefined actuator position, said locking cam actuator surface and said locking cam surface causes said resilient locking tongue to lock said button into said locking position, and in a second predefined actuator position said unlocking cam actuator surface and said unlocking cam surface causes said resilient tongue to unlock from said button to an unlock position.

14. A clip mount as claimed in claim 13 wherein said movable cam actuator is biased towards said predefined position.

15. A clip mount as claimed in claim 14 wherein said cam actuator includes a first, exposed terminal end defining a user actuation surface thereat and a second end disposed about said locking cavity.

16. A clip mount as claimed in claim 15 including a resilient member, disposed between said cam actuator and said body, biasing said cam actuator towards said predefined position.

17. A method of mounting a cellular phone attachment system with a button mount onto a clip mount comprising:
provide a clip mount body defining a complementary locking cavity for said button and a resilient locking tongue disposed in said complementary locking cavity;
biasing said button into a locking position in said locking cavity with an outboard force from an interfacing locking cam surface and cam actuator surface;
providing a sloped unlocking first cam surface on said resilient locking tongue; and
moving an unlocking second cam surface over the unlocking first cam surface thereby flexing said resilient locking tongue outboard from a first locking position to a second button release position.

18. A method as claimed in claim 17 including biasing said tongue into said locking position.

\* \* \* \* \*

UNITED STATES PATENT AND TRADEMARK OFFICE
CERTIFICATE OF CORRECTION

| | | |
|---|---|---|
| PATENT NO. | : 7,940,925 B2 | |
| APPLICATION NO. | : 12/051235 | |
| DATED | : May 10, 2011 | |
| INVENTOR(S) | : Fernando Tages | |

It is certified that error appears in the above-identified patent and that said Letters Patent is hereby corrected as shown below:

On the Title Page, Item (75)
Delete "Harold S. Goradesky" as the sole inventor and add --Fernando Tages-- as the sole inventor Signed and Sealed this
Twenty-eighth Day of June, 2011

David J. Kappos
*Director of the United States Patent and Trademark Office*